United States Patent
Sereinig

(10) Patent No.: US 11,879,699 B2
(45) Date of Patent: Jan. 23, 2024

(54) BARREL FOR A FIREARM WITH LOCKING SPACE, AND PRODUCTION PROCESS

(71) Applicant: GLOCK TECHNOLOGY GMBH, Ferlach (AT)

(72) Inventor: Siegfried Sereinig, Klagenfurt (AT)

(73) Assignee: GLOCK TECHNOLOGY GMBH, Ferlach (AT)

( * ) Notice: Subject to any disclaimer, the term of this patent is extended or adjusted under 35 U.S.C. 154(b) by 111 days.

(21) Appl. No.: 17/753,520

(22) PCT Filed: Sep. 28, 2020

(86) PCT No.: PCT/EP2020/077093
§ 371 (c)(1),
(2) Date: Mar. 5, 2022

(87) PCT Pub. No.: WO2021/063882
PCT Pub. Date: Apr. 8, 2021

(65) Prior Publication Data
US 2022/0333889 A1    Oct. 20, 2022

(30) Foreign Application Priority Data
Oct. 4, 2019 (EP) .................................. 19201453

(51) Int. Cl.
*F41A 3/30* (2006.01)
*F41A 21/12* (2006.01)
*B33Y 80/00* (2015.01)

(52) U.S. Cl.
CPC ............... *F41A 3/30* (2013.01); *F41A 21/12* (2013.01); *B33Y 80/00* (2014.12)

(58) Field of Classification Search
CPC ............. F41A 3/30; F41A 21/12; B33Y 80/00
(Continued)

(56) References Cited

U.S. PATENT DOCUMENTS 5,559,302 A * 9/1996 Latka .................... F41A 21/325
89/14.05
8,938,903 B2 * 1/2015 Larue ..................... F41A 21/12
89/14.05

(Continued)

FOREIGN PATENT DOCUMENTS

DE           923103 C     2/1995
DE      102007034670 A1   1/2009
(Continued)

OTHER PUBLICATIONS

International Search Report, PCT/EP2020/077093, dated Jan. 11, 2021.

*Primary Examiner* — Samir Abdosh
(74) *Attorney, Agent, or Firm* — Raven Patents, LLC; Anton E. Skaugset

(57) ABSTRACT

A barrel for a firearm having a bore axis, a cartridge chamber, and an integrally formed locking sleeve with a locking space, with locking lugs, the locking sleeve has recesses for bolt head lugs of a bolt head to be inserted. The barrel has, in the direction towards the cartridge chamber, at least two centering ramps in the transition area between the recess for the lugs and the locking space in an oblique manner with respect to the bore axis. Further the recesses forming the bayonet-type groove, viewed in the direction of the bore axis, each have a profile which comprises an elliptical segment. The disclosure additionally provides a production process for such a barrel.

13 Claims, 4 Drawing Sheets

(58) Field of Classification Search
USPC .......................................................... 42/76.01
See application file for complete search history.

(56) References Cited

U.S. PATENT DOCUMENTS

| | | | |
|---|---|---|---|
| 2002/0050087 A1* | 5/2002 | Murello | F41A 9/41 |
| | | | 42/16 |
| 2007/0033851 A1 | 2/2007 | Hochstrate | |
| 2018/0128567 A1* | 5/2018 | Foster | F41A 3/30 |
| 2022/0252369 A1* | 8/2022 | Geissele | F41A 21/12 |

FOREIGN PATENT DOCUMENTS

| | | |
|---|---|---|
| DE | 102007034675 A1 | 1/2009 |
| EP | 0055307 B1 | 3/1986 |
| EP | 2964407 | 1/2016 |
| EP | 2663827 A2 | 10/2018 |

\* cited by examiner

BARREL FOR A FIREARM WITH LOCKING SPACE, AND PRODUCTION PROCESS

TECHNICAL FIELD

The disclosure generally relates to firearms, and more particularly relates to a barrel for a firearm, comprising a cartridge chamber, an integral locking sleeve with locking space, and a method for its production.

BACKGROUND

Cartridge chambers are provided in firearms, for example, rifles, to receive the cartridges in the charged state and place the projectile in the barrel accordingly. In bolting locking systems, particularly the rotary piston lock, which is used, for example, in M4- or AR15-based systems, the so-called locking sleeve frequently adjoins the barrel and the cartridge chamber, and comprises the locking space, the locking lugs, and recesses, forming a bayonet-type groove, for bolt head lugs. For sealing the barrel toward the rear when firing, the bolt head is guided parallel to the bore axis in the firing direction through the bolt head passage into the locking space and then axially rotated by a forced rotational movement; the bolt head lugs engage behind the locking lugs, completing the locking process.

Particularly in the field or during automatic firing, contaminations, oscillations, shaking, vibrations and/or other influences can be the reason that the movement of the bolt head parallel to the bore axis takes place acentrically in the locking space. The locking process and subsequently the automatic reloading is thus made more difficult. For example, the bolt head can strike the step between the bayonet-type groove and the locking space and lead to restlessness of the firearm. At worst, this can result in loading and/or feed jams of the firearm. Furthermore, the acentric movement of the bolt head causes premature wear and thus reduces the lifespan of the affected components.

From the prior art, two-piece designs for barrel and locking sleeve are generally known. The processing by means of machining methods, e.g., cutting or milling of the threads, requires appropriate material thicknesses in order to be able to have the required minimum material thicknesses in case of load. The milling of the locking lugs parallel to the bore axis also results in a round profile which again requires more material thickness than a flat profiling.

If machining methods are used, a repeated clamping is required to produce barrel, cartridge chamber, locking lugs, and the locking space.

Numerous proposals are known from the prior art, the most important ones shall be briefly described in the following, wherein the contents of all English-language documents shall by reference become part of the content of the present application.

By way of example, US2007033851A1 (Colt Defense LLC) shall be cited, which discloses a carbine with a one-piece barrel, including a cartridge chamber, and a screw-threaded locking sleeve for forming the locking space. In such two-piece designs with a screwable locking sleeve, a relatively high expenditure in terms of production for producing the thread on the barrel and the locking sleeve is required. Furthermore, the cumulative tolerance accumulated by the tolerance of the individual threads of the threaded connection can be detrimental in terms of length and positional accuracy with regard to the axial alignment. In addition, a locking pin present for securing the screw connection between the barrel and the locking sleeve equals a further, additional component and production expenditure. Furthermore, due to the screw connection and possible differences in the hardness of the materials of the barrel and the locking sleeve, this can result in a relatively great material thickness, particularly in the area of the locking sleeve. In addition, the segmented design of barrel, cartridge chamber and/or locking sleeve equals a high number of components. EP0055307B1, DE102007034670A1, DE102007034675A1, and EP2663827A2 also disclose two-piece designs of the barrel with the cartridge chamber and the locking sleeve with locking space, but without addressing their production in detail.

One-piece designs for a barrel with cartridge chamber are also known from DE923103C and U.S. Pat. No. 8,938,903B2. The one-piece design is achieved by forging over a mandrel, wherein the formation of a locking chamber and thus also of locking lugs and a bayonet-type groove is completely absent.

In US2002/0050087A1 a loading apparatus for cartridges into a cartridge chamber is disclosed, wherein the loading apparatus comprises a locking piece being fastened to the cartridge chamber, or integrally formed with the barrel and the cartridge chamber. Although a method of aligning a bolt head axis with a bore axis is disclosed, no further information on reduction of weight and enhancement of durability can be found.

A method for producing a one-piece barrel with cartridge chamber and locking sleeve with locking chamber is known from EP2964407B1 (Steyr Mannlicher) and for the most part addresses hammering over two mandrels. The formation of the locking space is not described in detail.

For economic reasons and to avoid the above-mentioned respective technical disadvantages, what is needed is a more cost-effective production method for firearms, with preferably a small number of components. There is thus a need for a one-piece barrel with cartridge chamber and an integral locking sleeve with locking space and locking lugs formed integrally in the locking sleeve, which does not have the above-mentioned disadvantages of the prior art, but has the initially described properties. The present disclosure addresses the problem of providing such a one-piece barrel with a cartridge chamber and an integral locking sleeve with locking space and integral locking lugs.

SUMMARY

According to the present disclosure, these problems are solved in that an initially described barrel has a locking sleeve that guides a bolt head during its insertion in a centering manner, and so all the problems mentioned can be prevented.

In one example, the present disclosure is directed to a barrel for a firearm, where the barrel defines a bore axis, a cartridge chamber, and an integrally-formed locking sleeve including a locking space. The locking sleeve includes a plurality of inwardly extending locking lugs that are integrally formed with the barrel, and the locking sleeve defines a plurality of recesses configured to receive bolt head lugs of a bolt head to be introduced into the locking sleeve, and the plurality of recesses form grooves for a bayonet-type coupling between the locking sleeve and the bolt head. At least two centering ramps are formed in a transition area between the recesses for receiving the bolt head lugs and the locking space, the centering ramps extending in a direction towards the cartridge chamber in an oblique manner with respect to the bore axis, so that the centering ramps are guide the bolt head in a centering manner when the bolt head is introduced into the locking space of the locking sleeve, and the recesses forming the grooves for the bayonet-type coupling between the locking sleeve and the bolt head, when viewed in the direction of the bore axis, each exhibit a profile that includes an elliptical segment.

In another example, the present disclosure is directed to a firearm that includes such a barrel.

In another example, the present disclosure is directed to a method for producing a barrel for a firearm, the method including providing a one-piece barrel that defines a cartridge chamber and a locking sleeve, the locking sleeve including a locking space; forming at least two recesses in the locking sleeve configured to receive bolt head lugs; and forming at least two centering ramps in a transition area between the at least two recesses for bolt head lugs in a direction toward the cartridge chamber and the locking space.

It is thus possible to achieve in a technologically simple and cost-effective manner that the barrel and the integral locking sleeve are designed as one piece and that the locking lugs are designed to be integral; the bolt head is automatically centered when inserted into the locking space; the automatic centering of the bolt head is effected by the shape of the locking space as described below; the oblique shape of the locking space, as described below, in the transition area between the recesses for the bolt head lugs in the direction of the cartridge chamber forms a centering ramp for the bolt head.

BRIEF DESCRIPTION OF THE DRAWINGS

In the following, the invention shall be explained in more detail using the drawings.

DETAILED DESCRIPTION

In the application and the claims, "integral" refers to the one-piece design, regardless of whether it is effected by material removal, such as milling or grinding, by shape-changing processes, such as forging, or by additive methods, such as 3D printing processes. These are contrasted by designs that, by screwing, gluing, welding, etc. of several parts, form one barrel, even if it can no longer be disassembled.

Figure 1:
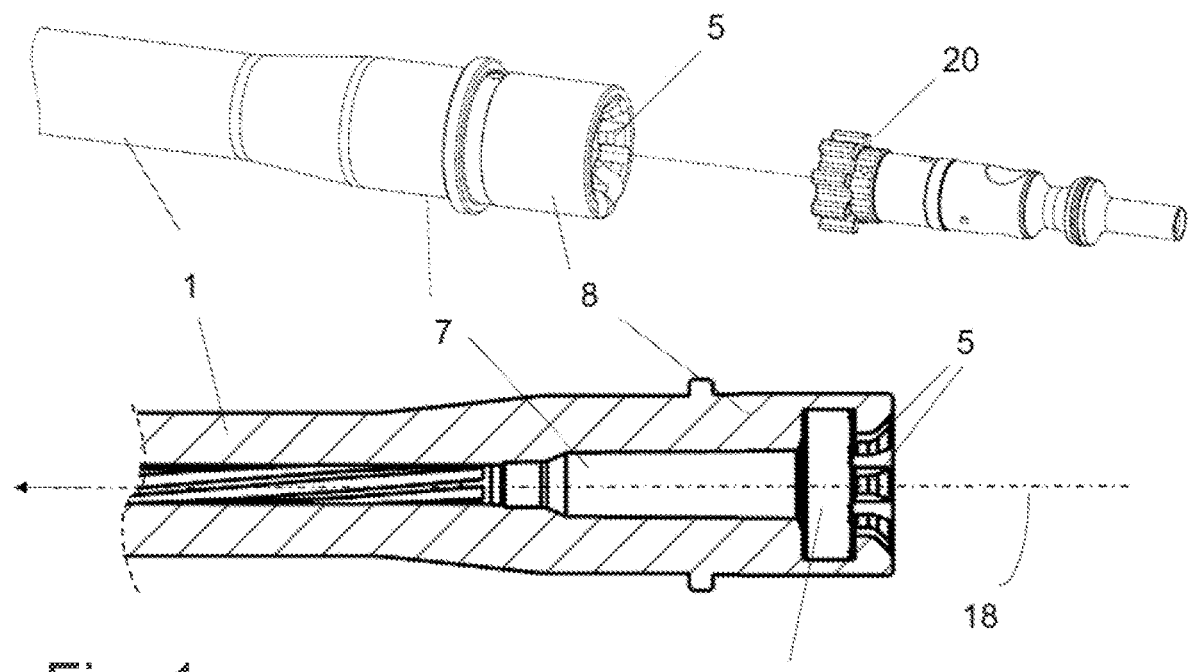
FIG. 1 shows a cutaway view along the bore axis of an exemplary one-piece barrel according to the present disclosure with a cartridge chamber and an integral locking sleeve with locking space and integral locking lugs.

FIG. 1 shows a one-piece barrel 1 with a bore axis 18 with a cartridge chamber 7 and an integrally formed locking sleeve 8 with a locking space 11 and integrally formed locking lugs 5. Strictly speaking, the bore axis 18 is the axis of the barrel bore 4, commonly called barrel axis; the firing direction runs in the direction of the arrow P.

Figure 2:
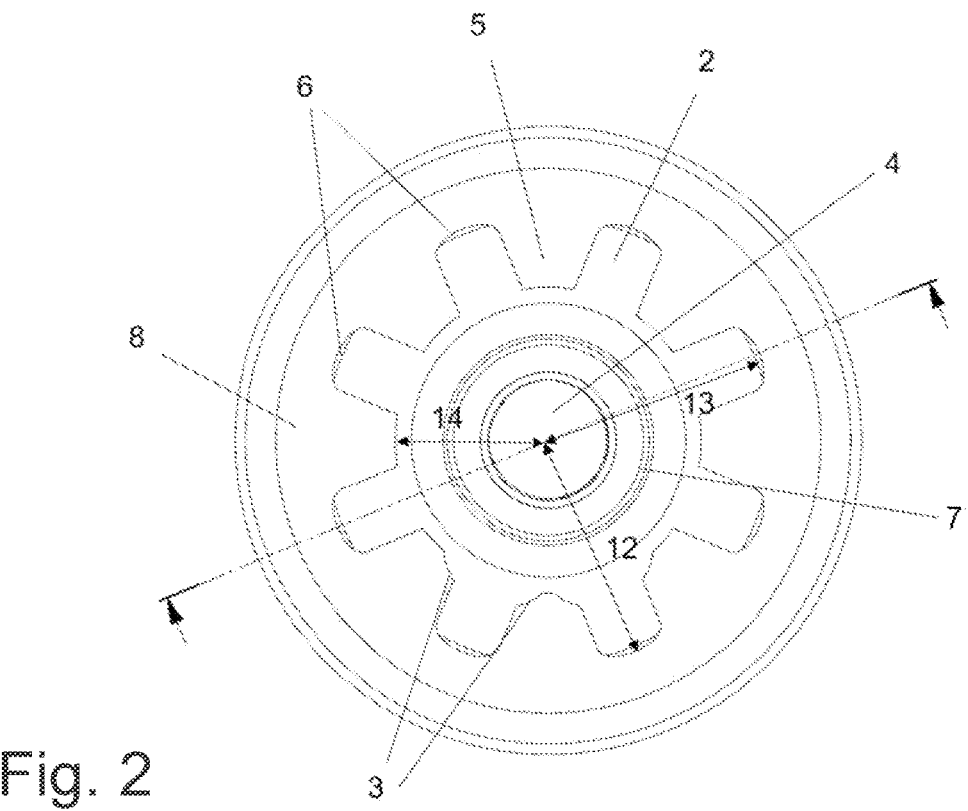
FIG. 2 shows a top view of the locking sleeve of FIG. 1 in the direction of the bore axis.

FIG. 2 shows a top view in the firing direction P of the barrel 1 with locking sleeve 8, with the barrel bore 4, the cartridge chamber 7, the locking lugs 5, and recesses 2, which form a bayonet-type groove for lugs of the bolt head. As can be clearly seen, eight recesses are provided, through which the eight lugs of the bolt head are axially inserted and then rotated (optimally by 360°/8=45°). In the description and also the claims, the corresponding embodiments are mostly described using one lug, one recess, etc., but their plurality is not supposed to be disregarded.

During loading, the cartridge to be inserted reaches the cartridge chamber 7 via the feed ramps 3. During locking, the bolt head (not depicted) is moved parallel to the bore axis in the firing direction. The bolt head lugs (not depicted) reach the locking space 11 (FIGS. 3 and 4) through the recesses 2 of the locking sleeve; the bolt head is subsequently rotated in the circumferential direction, placing the bolt head lugs behind the locking lugs 5, thus locking them.

Influences occurring in the field or during automatic firing, such as contaminations, oscillations, shaking, vibrations, and the like, can lead to an acentric movement of the bolt head. With the use of centering ramps 6, said acentric movements are compensated, and the bolt head is automatically centered, thus avoiding possible jams and premature wear.

Figure 3:
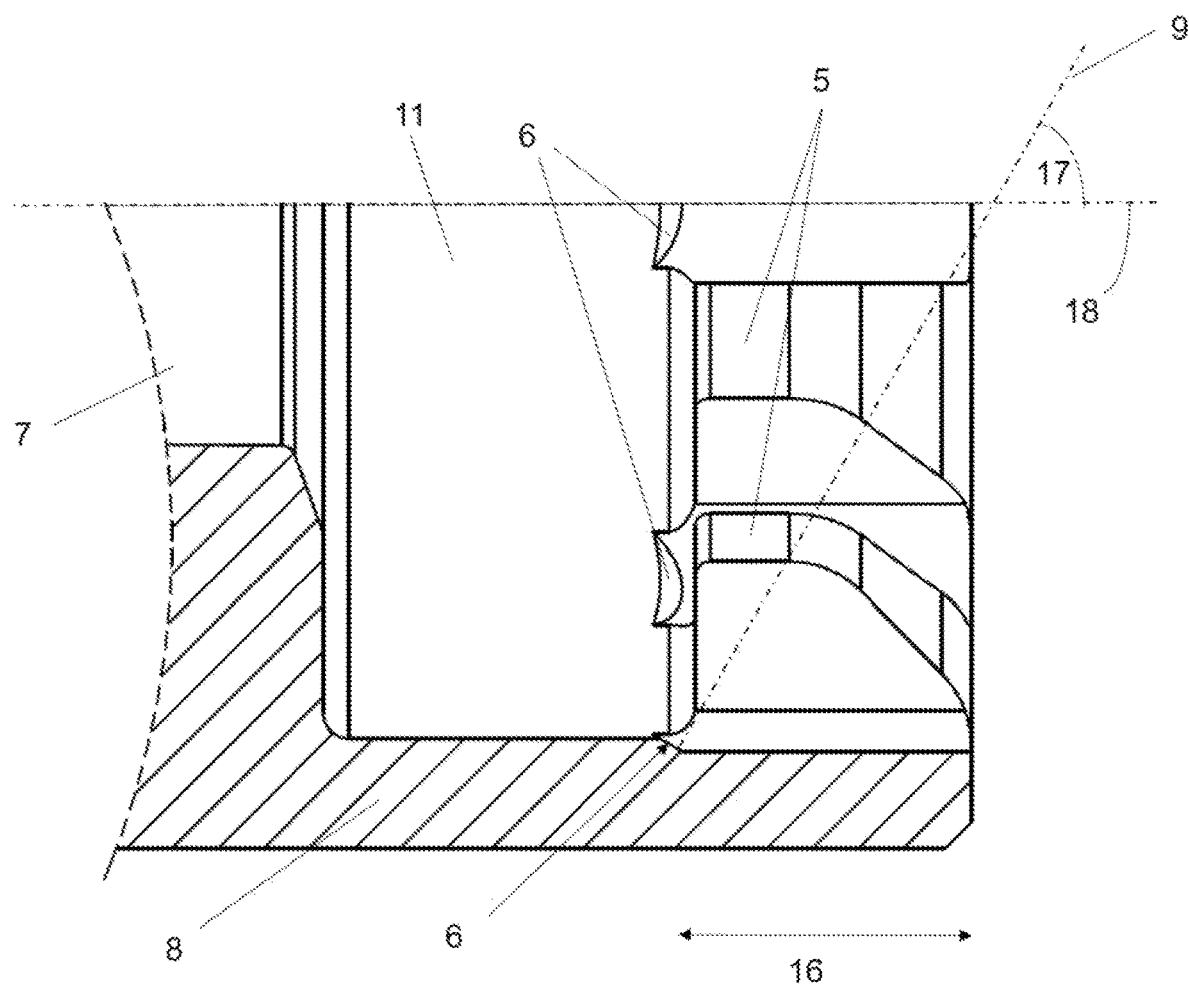
FIG. 3 shows a detailed view of the exemplary one-piece barrel of FIG. 1 on an enlarged scale.

FIG. 3 shows a detailed view of the locking sleeve as a cutaway view along the bore axis 18 with the centering ramp 6. The surface normal 9 on the centering ramp 6 and the angle α denoted with 17, between the surface normal 9 and the bore axis 18, are also shown. This angle is also called the cone angle, although strictly speaking, it does not describe a conical surface but a side surface of a pyramid. In the cutaway view, these angles coincide in the bore axis/cutter axis plane (FIG. 4).

Figure 4:
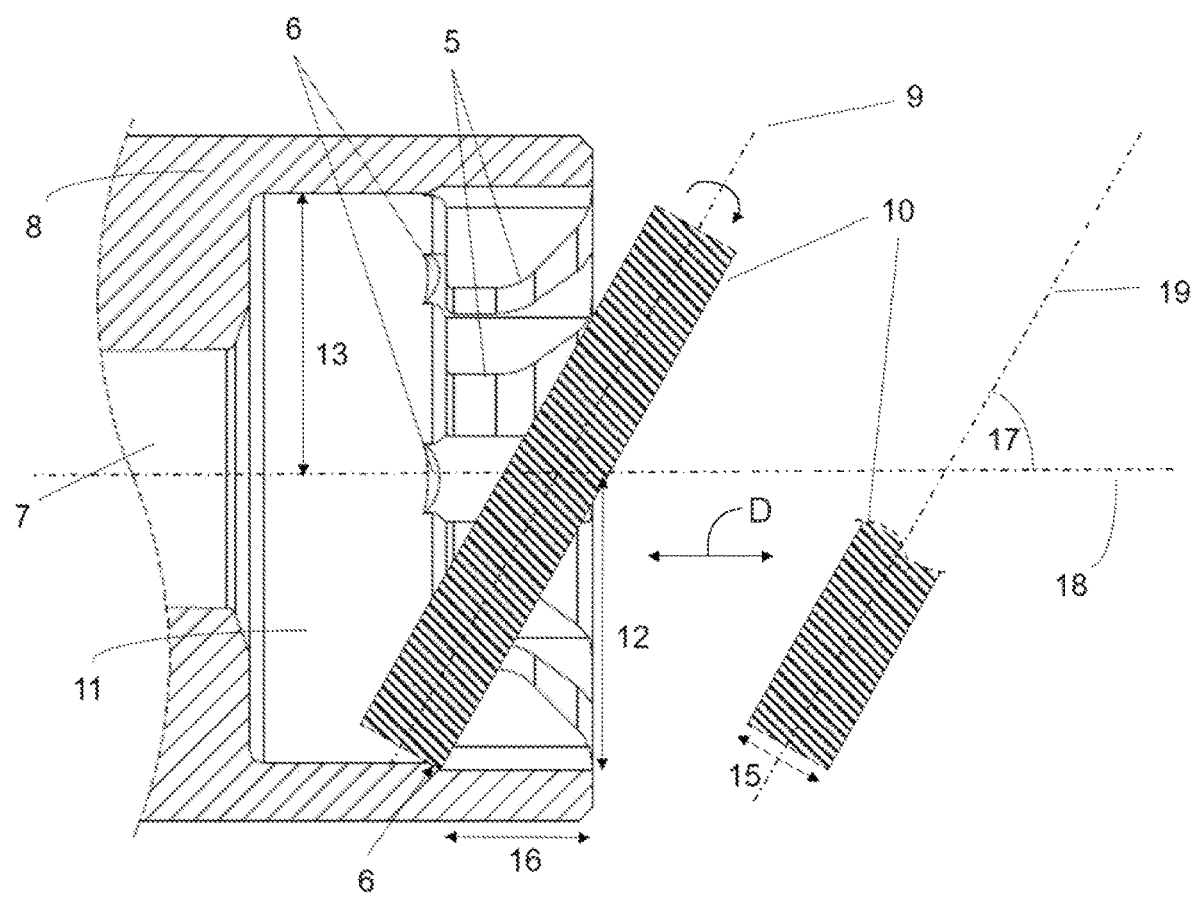
FIG. 4 shows an exemplary production method for the firearm barrels of the present disclosure employing a milling tool.

FIG. 4 shows an embodiment of a production method according to the invention of the centering ramp 6 by means of obliquely tilted circular cylindrical cutters 10 with a cutter axis 19 (which runs parallel to or coincides with the surface normal 9) and an end face running normally thereto. The movement of the cutter 10 during the production process is indicated by the double arrow D.

The shape and naturally also the dimensions of the centering ramp 6 are defined by: the angle (α) 17 which (theoretically) can be a minimum of 0° and a maximum of 90°, the width of the locking lugs 16, the radius ($r_1$) 12 of the bayonet-type groove, the radius ($r_2$) 13 of the locking space, the radius ($r_3$) 14 of the bolt head passage, and the diameter ($D_W$) 15 of the machining tool, or the ratios of these variables to one another.

The production method of the present disclosure is not limited to the depicted and described embodiment; other machining methods, such as shaping and drawing, or additive production processes, such as 3D printing, or other production processes can be used.

Figures 5A, 5B, 5C:
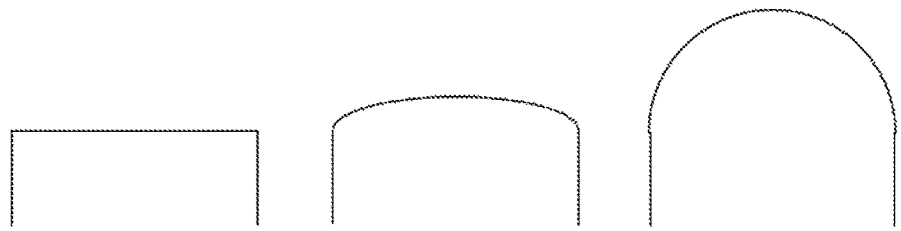
FIGS. 5A, 5B, and 5C depict three exemplary profiles of the recesses for the locking lugs.

FIGS. 5A, 5B, and 5C depict different profiles of the recesses 2 forming the bayonet-type groove for the bolt head lugs, viewed in the direction of the barrel axis 18. Depending on the selected parameters of the production process by milling, the corresponding profile can be selected or achieved. FIG. 5A shows the theoretical profile of a rectangular surface, which would be the result if the cutter is used in the borderline case of the angle (α) 17=90°, i.e., the cutter axis 19 is normal to the barrel axis 18. The second borderline case with an angle (α) 17=0°, thus parallel to the barrel axis 18, would have a profile with a rectangular surface with an adjacent semicircular surface, see FIG. 5C. The embodiment of the recesses achievable according to the invention for the bolt head lugs by obliquely applying the cutter 10 leads to a profile with an essentially rectangular base which is adjoined by an elliptical segment-shaped partial surface, FIG. 5B.

It is immediately obvious that the two borderline cases do not entail any advantages; in the first case, the sharp-edged design of the profile causes the problem of notch stresses, which naturally must be avoided. The second borderline case avoids the problems of the notch stress, but a comparatively great material thickness in the radial direction is required in order to be able to ensure passage of the bolt head lugs, which generally have a rectangular profile. The solution according to the invention with an oblique cutter axis is thus advantageous over both borderline cases.

The solution according to the invention allows for a smooth and continuous insertion of the bolt head into the locking space with automatic centering of the bolt head during the locking process. It has been found that during insertion into the locking sleeve, the bolt head can slide along the inclined centering ramps, resulting in the self-centering. As a result, premature material wear and loading or feed jams can also be avoided. Furthermore, the solution according to the invention achieves weight savings because the design of a barrel with a cartridge chamber and integral locking sleeve results in material savings at simultaneously high achievable strengths. In addition, the production only requires a one-time clamping.

For a further weight reduction, an adapted profile, viewed correspondingly in the barrel direction, of the recesses forming the bayonet-type groove for the bolt head lugs would be desirable, which is achievable in one embodiment of the invention.

Figure 6:
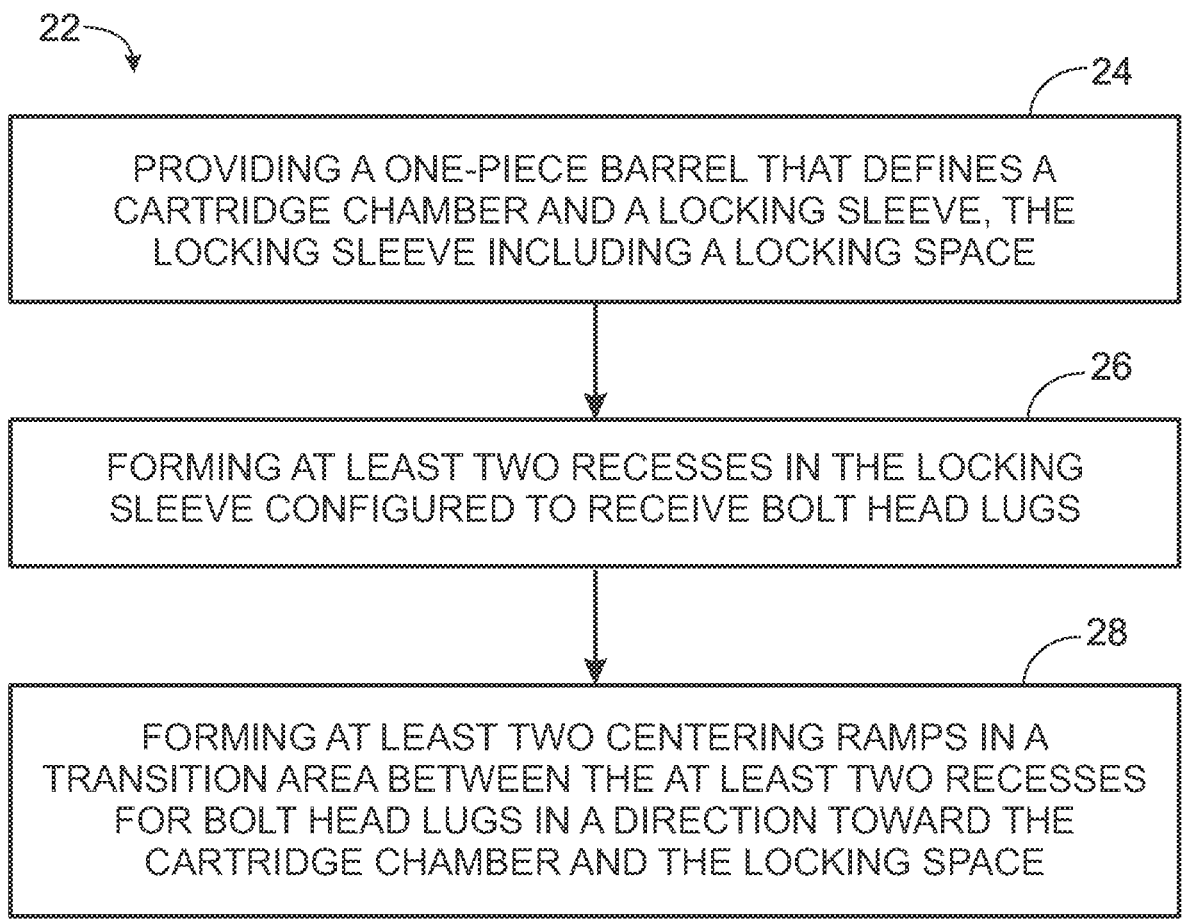
FIG. 6 is a flowchart of an exemplary method for producing a barrel for a firearm, according to the present disclosure.

An exemplary method for producing a barrel for a firearm according to the present disclosure is set out in flowchart 22 of FIG. 6. The method of flowchart 22 includes providing a one-piece barrel that defines a cartridge chamber and a locking sleeve, the locking sleeve including a locking space, at step 24 of flowchart 22; forming at least two recesses in the locking sleeve configured to receive bolt head lugs, at step 26 of flowchart 22; and forming at least two centering ramps in a transition area between the at least two recesses for bolt head lugs in a direction toward the cartridge chamber and the locking space, at step 28 of flowchart 22.

The entire production of such a barrel according to the invention is possible, for example, by means of forging, hammering, and subsequent machining processes, such as milling, shaping, and drawing. However, it is also conceivable to use additive methods (3D printing) or a combination of these methods.

The incline of the centering ramp can be produced, for example, as described in detail, by milling with an obliquely applied cutter. The work angle of the cutter is equal to the angle ($\alpha$) 17, which is formed between a surface normal to the centering ramp and the bore axis, also called cone angle.

The optimum work angle $\alpha$ of the cutter can easily be determined by a person skilled in the art on the basis of the width of the locking lugs, the radius of the bayonet-type groove $r_1$, the radius of the locking space $r_2$ the radius of the bolt head passage $r_3$, and the diameter $D_W$ of the machining tool. An angle range from >0° to a maximum of 90°, preferably from 15-75° and particularly preferably from 45-60°, has proven to be particularly practical.

As an alternative to milling, a shaping or broaching operation is also possible, wherein a shaper is moved in the direction of the bore axis of the barrel such that the recesses for the bolt head lugs are formed, and the tool is shifted radially inwards such that, when the locking space is reached, a previously mentioned centering ramp is formed for the bolt head to be introduced. It is also conceivable to produce the locking sleeve designed according to the invention by means of additive methods, such as 3D printing methods.

In the context of the present disclosure, it has been found that it is particularly advantageous if the bolt head has obliquely shaped the locking lugs as a mating surface to the centering ramps for supporting the automatic centering process.

Furthermore, it has been realized that the profile of the recesses 2 forming the bayonet-type groove, viewed in the barrel direction, is particularly important for achieving the smallest possible material thickness and thus for saving mass.

In the description and the claims, the terms "front," "rear," "top," "bottom," etc. are used in the common form and with reference to the object in its normal operating position. This means that in the case of a weapon, the muzzle of the barrel is in the "front," that the lock or the carriage is moved toward the "rear" by the explosion gases, etc. "Barrel direction" is the direction of the bore axis; "transversely thereto" essentially refers to a direction rotated by 90° to said bore axis.

It should also be noted that in the description and claims, specifications, such as "lower area" of a hanger, reactor, filter, building, or a device or, more generally, an object, refer to the lower half and particularly to the lower quarter of the total height, "bottom area" refers to the bottom quarter, and particularly to an even smaller portion; while "center area" refers to the middle third of the total height (width–length). All these specifications have their general meaning, applied to the intended position of the object viewed.

In the description and claims, the terms "essentially" and "substantially" refer to a deviation of up to 10% of the stated value, if it is physically possible, both downwards and upwards, otherwise only in the meaningful direction; for degree specifications (angle and temperature), ±10° shall apply.

Unless they relate to the specific examples, all specifications regarding quantities and portions, particularly those for delimiting the invention, are supposed to indicate a ±10% tolerance, for example: 11% means: from 9.9% to 12.1%. For terms such as "a solvent" or "a locking lug," the word "a" or "an" is to be regarded as an indefinite article or as a pronoun, unless the context indicates otherwise.

Unless otherwise specified, the term: "combination" or "combinations" refers to all types of combinations, proceeding from two of the relevant components to a multiplicity, or also all, of such components; the term "containing" also stands for "consisting of."

The features and variations specified in the individual embodiments and examples can be freely combined with the features and variations of the other examples and embodiments, and can also be used without the obligatory inclusion of the other details of the respective embodiment or the respective example, particularly for characterizing the invention in the claims.

LIST OF REFERENCE SIGNS

1 Barrel
2 Recess(es)
3 Cartridge feed ramps
4 Barrel bore
5 Locking lugs

6 Centering ramp
7 Cartridge chamber
8 Locking sleeve
9 Surface normal
10 Cutter
11 Locking space
12 Radius of the bayonet-type groove $r_1$
13 Radius of the locking space $r_2$
14 Radius of the bolt head passage $r_3$
15 Radius of the machining tool $D_W$
16 Width of the locking lugs parallel to the bore axis
17 Angle α
18 Bore axis (of the barrel)
19 Cutter axis
20 Bolt head
22 Flowchart
24 Flowchart step
26 Flowchart step
28 Flowchart step

The invention claimed is:

1. A barrel for a firearm; wherein
the barrel defines a bore axis;
the barrel defines a cartridge chamber; and
the barrel defines an integrally-formed locking sleeve including a locking space, the locking sleeve including a plurality of inwardly extending locking lugs that are integrally formed with the barrel, and the locking sleeve defining a plurality of recesses configured to receive bolt head lugs of a bolt head to be introduced into the locking sleeve, the plurality of recesses forming grooves for a bayonet-type coupling between the locking sleeve and the bolt head;
wherein at least two centering ramps are formed in a transition area between the recesses for receiving the bolt head lugs and the locking space, the centering ramps extending in a direction towards the cartridge chamber in an oblique manner with respect to the bore axis, such that the centering ramps are configured to guide the bolt head in a centering manner when the bolt head is introduced into the locking space of the locking sleeve; and
wherein the recesses forming the grooves for the bayonet-type coupling between the locking sleeve and the bolt head, when viewed in the direction of the bore axis, each exhibit a profile that includes an elliptical segment.

2. The barrel for a firearm according to claim 1, wherein each oblique centering ramp extends at an oblique angle α with respect to the bore axis, wherein 0°<α<90°.

3. The barrel for a firearm according to claim 1, wherein each oblique centering ramp extends at an oblique angle α with respect to the bore axis, wherein 15°<α<75°.

4. The barrel for a firearm according to claim 1, wherein each oblique centering ramp extends at an oblique angle α with respect to the bore axis, wherein 45°<α<60°.

5. A firearm, comprising a barrel;
wherein the barrel defines a bore axis;
the barrel defines a cartridge chamber; and
the barrel defines an integrally-formed locking sleeve including a locking space, the locking sleeve including a plurality of inwardly extending locking lugs that are integrally formed with the barrel, and the locking sleeve defining a plurality of recesses configured to receive bolt head lugs of a bolt head to be introduced into the locking sleeve, the plurality of recesses forming grooves for a bayonet-type coupling between the locking sleeve and the bolt head;
wherein at least two centering ramps are formed in a transition area between the recesses for receiving the bolt head lugs and the locking space, the centering ramps extending in a direction towards the cartridge chamber in an oblique manner with respect to the bore axis, such that the centering ramps are configured to guide the bolt head in a centering manner when the bolt head is introduced into the locking space of the locking sleeve; and
wherein the recesses forming the grooves for the bayonet-type coupling between the locking sleeve and the bolt head, when viewed in the direction of the bore axis, each exhibit a profile that includes an elliptical segment.

6. The firearm according to claim 5, the firearm further comprising the bolt head to be introduced into the locking sleeve, wherein the locking lugs of the bolt head include obliquely formed mating surfaces toward the centering ramp (6).

7. The firearm according to claim 5, wherein the firearm is a rifle.

8. The firearm according to claim 5, wherein the firearm is an automatic rifle.

9. A method for producing a barrel for a firearm, comprising:
providing a one-piece barrel that defines a cartridge chamber and a locking sleeve, the locking sleeve including a locking space;
forming at least two recesses in the locking sleeve configured to receive bolt head lugs; and
forming at least two centering ramps in a transition area between the at least two recesses for bolt head lugs in a direction toward the cartridge chamber and the locking space.

10. The method according to claim 9, wherein forming the at least two centering ramps is performed in a machining manner.

11. The method according to claim 9, wherein forming the at least two centering ramps includes obliquely applying a cutter along a path parallel to the bore axis.

12. The method according to claim 9, wherein forming the at least two centering ramps including forming the at least two centering ramps by a two-stage shaping process.

13. The method according to claim 9, wherein the locking sleeve defined by the barrel is formed by additive manufacturing.

* * * * *